A. F. JENKINS.
ACETYLENE GENERATOR.
APPLICATION FILED FEB. 20, 1909.
1,023,850.
Patented Apr. 23, 1912.
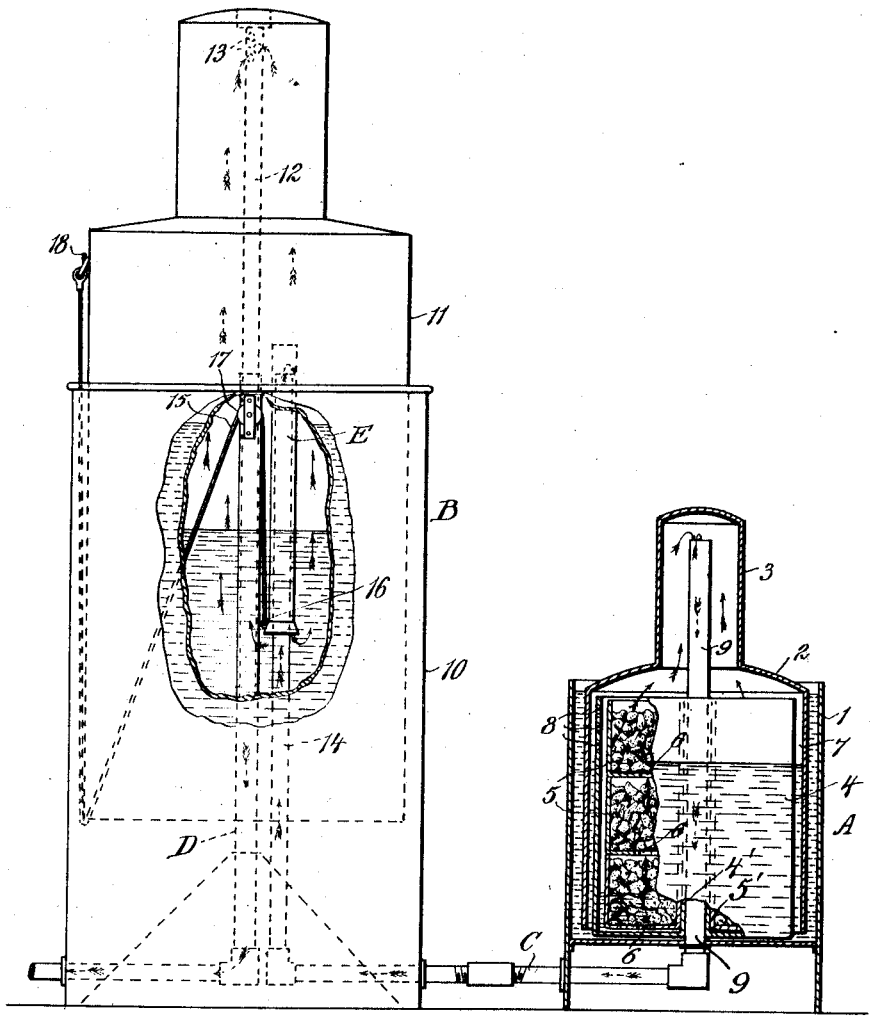

UNITED STATES PATENT OFFICE.

ALEXANDER FREDERICK JENKINS, OF BALTIMORE, MARYLAND, ASSIGNOR TO THE ALEXANDER MILBURN COMPANY, OF BALTIMORE, MARYLAND, A CORPORATION OF MARYLAND.

ACETYLENE-GENERATOR.

1,023,850.  Specification of Letters Patent.  Patented Apr. 23, 1912.

Application filed February 20, 1909. Serial No. 479,183.

*To all whom it may concern:*

Be it known that I, ALEXANDER FREDERICK JENKINS, a subject of the King of Great Britain, residing at Baltimore city, State of Maryland, have invented certain new and useful Improvements in Acetylene-Generators, of which the following is a specification.

This invention relates to an acetylene gas generator of that class in which water is fed to the calcium carbid for generating the gas.

The invention has for one of its objects to improve and simplify the construction and operation of apparatus of this character so as to be comparatively simple and inexpensive to produce, efficient and reliable in use, and requiring minimum attention.

Another object of the invention is to provide a generating set for house lighting systems and the like, the set including a generator and gasometer with but a single connection between them, the design being such that no outside working parts are required for controlling the operation of the apparatus, nor are automatic valves or equivalent means employed in the generator for regulating the feed of water to the carbid so that an extremely simple apparatus is provided.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, the figure is a view of the apparatus showing the generator in section and part of the gasometer broken away to better illustrate the internal parts.

Referring to the drawing, A designates the generator and B, the gasometer or holder for the gas, there being a single gas-conducting pipe C connecting the holder with the generator.

The generator A comprises a tank 1 that holds water and in which is arranged a bell 2 open at its bottom and having a hollow extension 3 rising centrally from the dome thereof and closed at its top. Within the bell is a cylinder 4 closed at its bottom and open at its top, and arranged within the same in superimposed relation are removable trays 5 for containing the calcium carbid, and these trays have openings 6 through which the water rises gradually during the operation to act on the carbid for producing the gas. The cylinder 4 is of smaller diameter than the bell so as to provide an annular water space that communicates at the bottom of the bell with the tank to receive water therefrom, and the space in the upper part of the bell becomes filled with gas and the pressure of this gas acting on the water in the annular space 7 controls the feed of water to the carbid. In order to obtain fine regulation, the water feeds through very small openings 8 in the wall of the cylinder 4 and these openings are arranged one above another so that when the demand for gas is comparatively small, the water will enter only through the lowermost opening, since the pressure of the gas in the generator will prevent the water from rising any higher and as the demand for gas increases by turning on more lights, the pressure consequently lowers so that the water will creep up to the second or third opening to admit an increased quantity of water to the carbid and thus accelerate the generation of gas.

It will thus be seen that the level of the water in the annular space 7 changes with the pressure of the gas. When the pressure increases the water level is lowered by the gas forcing some of the water out of the bottom of the bell into the tank until a balance is effected by the annular column of water in the tank surrounding the bell counterbalancing the annular column in the bell or space 7. If the consumption of gas is stopped the inner annular column of water in the space 7 will recede to a point below the bottom aperture 8 and hence no water will feed to the carbid as long as the apparatus is shut down, but when the gas valve is opened to light a burner and the pressure in the gasometer falls to a certain point, the inner annular column of water will rise automatically to again feed water to the carbid. The water feeds to the carbid chamber from the top of the column of water in the space 7.

The gas-conducting pipe has a vertical portion 9 that rises into the extension 3 of the generator and receives gas therefrom to deliver it to the gasometer. The vertical portion 9 of the pipe extends through central tubes 4' and 5' in the cylinder 4 and trays 5, respectively.

The gasometer B comprises a water-holding tank 10 of any approved construction and in which is arranged a bell 11 that receives the gas and holds the same under pressure. Arranged centrally within the gasometer is an outlet pipe D that is open at its upper end and receives the lower portion of a vertical pipe 12 secured to the bell to rise and fall therewith, said pipe having apertures 13 by means of which the gas enters and is conducted into the outlet pipe D. The gas-conducting pipe C has a vertically-extending portion 14 that rises in the gasometer and terminates at a point above the maximum water level. The flow of gas into the gasometer of the generator is controlled by a regulator E in the form of a tubular valve closed at its upper end and open at its bottom and mounted on the upper end of the pipe 14. The lower part of this valve is immersed in the water in the bell, so that water enters between the bell and pipe 14 and offers resistance to the flow of gas and by raising or lowering the valve, this resistance is varied with the result that more or less gas flows into the gasometer with the result that the pressure varies in the generator and permits the required amount of water to feed to the carbid to meet the demand for gas. In other words, the movement of the regulator E causes the water level in the space 7 of the generator to rise or fall for bringing the required number of feed openings 8 for the water into service for controlling the generation of gas without the interposition of valves or other working parts in the generator, and the distance between the generator and gasometer is immaterial. In the present instance, the regulator E is controlled by the movement of the bell 11, and for this purpose a flexible element, such as a cord, chain or the like 15, is attached at 16 to the regulating valve and extends upwardly therefrom and passes around a guide pulley 17 mounted on the fixed pipe D and from the pulley, the flexible element passes downwardly under the bottom edge of the bell and thence upwardly between the bell and wall of the tank to the hook 18 on the bell where the free end of the element is attached to the latter. By this means the downward movement of the bell will, at a certain point, engage and produce a draft on the flexible element whereby the regulating valve E is raised for the purpose of lowering the pressure in the generator and consequently feed more water to the carbid to accelerate the production of gas.

The flow of gas into the gasometer causes the bell to gradually rise and at the same time, the regulator valve lowers and retards the flow of gas so that the pressure in the generator increases and forces the water downwardly to reduce the amount feeding to the carbid. In this manner, the regulation of the apparatus is automatic and a substantially uniform pressure can be maintained in the service pipe.

By attaching the cord 15 to the exterior of the bell where it is accessible, the regulator E can be raised by pulling the cord and the result will be that the pressure in the generator is instantly reduced so that a large inrush of water to the carbid will take place for accelerating the generation of gas and by lengthening or shortening the cord, through tying or untying a knot, the position of the regulator can be changed to alter the normal pressure of the gas.

From the foregoing description, taken in connection with the accompanying drawing, the advantages of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claim.

Having thus described the invention, what I claim is:—

The combination of a gasometer tank, a bell mounted therein, an upright pipe for discharging gas into the bell, said pipe being located within the bell, a regulator arranged on the upper end of the pipe, a guide arranged at a fixed point within the tank and adjacent the regulator, a flexible element connected with the regulator for actuating the same by the movement of the bell, said element extending from the regulator over the guide and thence under the bottom edge of the bell and continuing upwardly therefrom between the tank and bell, and means for connecting the upper end of the element to the bell at a point above the top of the tank, with an acetylene generator connected with the said pipe and controlled automatically by the said regulator.

In testimony whereof I affix my signature in presence of two witnesses.

ALEXANDER FREDERICK JENKINS.

Witnesses:
A. THOMPSON,
B. BLAINE.

Copies of this patent may be obtained for five cents each, by addressing the "Commissioner of Patents, Washington, D. C."